United States Patent
Shiraiwa et al.

(10) Patent No.: US 9,916,607 B2
(45) Date of Patent: Mar. 13, 2018

(54) INK BILLING SYSTEM WITH CHANGEABLE BILLING RATE TABLE

(71) Applicant: Seiko Epson Corporation, Tokyo (JP)

(72) Inventors: Motofumi Shiraiwa, Nagano-ken (JP); Yoshihiro Ueno, Nagano-ken (JP); Mitsuhiko Maejima, Nagano-ken (JP); Shinji Takahashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 714 days.

(21) Appl. No.: 13/917,233

(22) Filed: Jun. 13, 2013

(65) Prior Publication Data

US 2013/0282503 A1 Oct. 24, 2013

Related U.S. Application Data

(63) Continuation of application No. 11/556,077, filed on Nov. 2, 2006, now Pat. No. 8,489,521.

(30) Foreign Application Priority Data

Nov. 7, 2005 (JP) ................................ 2005-322787

(51) Int. Cl.
G06Q 30/04 (2012.01)
G03G 21/02 (2006.01)
(Continued)

(52) U.S. Cl.
CPC ......... *G06Q 30/04* (2013.01); *G03G 15/0856* (2013.01); *G03G 21/02* (2013.01);
(Continued)

(58) Field of Classification Search
CPC .......... B41J 2/17566; B41J 2002/17569; B41J 2002/17589; G06Q 20/145; G06Q 30/04; G07F 13/025
See application file for complete search history.

(56) References Cited

U.S. PATENT DOCUMENTS 7,298,519 B2 * 11/2007 Silverbrook et al. ........ 358/1.16
7,743,000 B2 6/2010 Allen et al.
(Continued)

FOREIGN PATENT DOCUMENTS

JP 2000-011440 1/2000
JP 2001-134155 5/2001
(Continued)

OTHER PUBLICATIONS

Kippax, P. (2005). Measuring Particle Size Using Modern Laser Diffraction Techniques. Paint &Coatings Industry, 21 (8), 42 (6). Retrieved from https://dialog.proquest.com/professional/docview/674418574?accountid=142257 (Year: 2005).*

Primary Examiner — Michael P Harrington
(74) Attorney, Agent, or Firm — Foley & Lardner LLP (57) ABSTRACT

An ink billing system is used between a client company X 200 that prints information and a printer manufacturer that supplies ink cartridges (or toner) to company X 200. Company X 200 has a main server 210, a plurality of in-store servers 220, 230 in communication with the main server, and a plurality of inkjet (or laser) printers 240 each having an ink cartridge 20 (or toner) for printing according to commands from the in-store server 220, 230. When billing company X 200 based on the number of ink shots (or drum charging time) used by the printers 240 and stored on the main server 210, the terminal device 100 of the printer manufacturer changes the billing rate per unit of ink according to the ink shot count (or drum charging time).

4 Claims, 5 Drawing Sheets

(51) Int. Cl.
  *G06Q 20/14* (2012.01)
  *G07F 13/02* (2006.01)
  *G07F 15/08* (2006.01)
  *G03G 15/08* (2006.01)
  *G03G 15/00* (2006.01)

(52) U.S. Cl.
  CPC ........... *G06Q 20/14* (2013.01); *G06Q 20/145* (2013.01); *G07F 13/025* (2013.01); *G07F 15/08* (2013.01); *G03G 15/556* (2013.01)

(56) References Cited

U.S. PATENT DOCUMENTS

| | | | |
|---|---|---|---|
| 2002/0073002 A1 | 6/2002 | Horii et al. | |
| 2003/0020951 A1 | 1/2003 | Minowa et al. | |
| 2003/0151635 A1* | 8/2003 | Naka et al. | 347/7 |
| 2003/0191655 A1 | 10/2003 | Janz | |
| 2004/0012648 A1 | 1/2004 | Mizoguchi et al. | |
| 2005/0093902 A1 | 5/2005 | Kato et al. | |
| 2005/0108032 A1 | 5/2005 | Josephsen et al. | |
| 2005/0270571 A1* | 12/2005 | Fujitani et al. | 358/1.15 |
| 2006/0045595 A1 | 3/2006 | Hanaoka | |

FOREIGN PATENT DOCUMENTS

| | | |
|---|---|---|
| JP | 2001-347734 | 12/2001 |
| JP | 2002-36582 | 2/2002 |
| JP | 2002-067451 | 3/2002 |
| JP | 2002-149020 | 5/2002 |
| JP | 2003-114596 | 4/2003 |
| JP | 2003-122209 | 4/2003 |
| JP | 2003-150776 | 5/2003 |
| JP | 2003-182107 | 7/2003 |
| JP | 2004-090517 | 3/2004 |
| JP | 2005-221748 | 8/2005 |

* cited by examiner

2006 July 1

| PRINTER SERIAL NUMBER | PREVIOUS COUNT | RECEIVED COUNT | DIFFERENCE | CURRENT COUNT |
|---|---|---|---|---|
| 1000123 | 0 | 454,329,404 | 454,329,404 | 454,329,404 |
| 1000209 | 0 | 504,315,000 | 504,315,000 | 504,315,000 |
| TOTAL | | | 958,644,404 | |

FIG. 4A

2006 AUGUST 1

| PRINTER SERIAL NUMBER | PREVIOUS COUNT | RECEIVED COUNT | DIFFERENCE | CURRENT COUNT |
|---|---|---|---|---|
| 1000123 | 454,329,404 | 863,225,868 | 408,896,464 | 863,225,868 |
| 1000209 | 504,315,000 | 1,059,061,500 | 554,746,500 | 1,059,061,500 |
| 1000154 | 0 | 453,883,500 | 453,883,500 | 453,883,500 |
| TOTAL | | | 1,417,526,464 | |

FIG. 4B

2006 SEPTEMBER 1

| PRINTER SERIAL NUMBER | PREVIOUS COUNT | RECEIVED COUNT | DIFFERENCE | CURRENT COUNT |
|---|---|---|---|---|
| 1000123 | 863,225,868 | 1,362,988,212 | 499,762,344 | 1,362,988,212 |
| 1000209 | 1,059,061,500 | | | 1,059,061,500 |
| 1000154 | 453,883,500 | 998,543,700 | 544,660,200 | 998,543,700 |
| TOTAL | | | 1,044,422,544 | |

FIG. 4C

2006 OCTOBER 1

| PRINTER SERIAL NUMBER | PREVIOUS COUNT | RECEIVED COUNT | DIFFERENCE | CURRENT COUNT |
|---|---|---|---|---|
| 1000123 | 1,362,988,212 | 1,726,451,735 | 363,463,523 | 1,726,451,735 |
| 1000209 | 1,059,061,500 | 1,765,102,500 | 706,041,000 | 1,765,102,500 |
| 1000154 | 998,543,700 | 1,361,650,500 | 363,106,800 | 1,361,650,500 |
| TOTAL | | | 1,432,611,323 | |

INK BILLING SYSTEM WITH CHANGEABLE BILLING RATE TABLE

CROSS-REFERENCE TO RELATED APPLICATIONS

This application is a continuation of, and claims priority on under 35 U.S.C. §120 on, application Ser. No. 11/556,077, filed Nov. 2, 2006, which claims priority under 35 U.S.C. §119 on Japanese patent application No. 2005-322787, filed Nov. 7, 2005. Each of these related applications is hereby incorporated by reference in its entirety.

BACKGROUND OF THE INVENTION

Field of the Invention

The present invention relates to an ink billing system and ink billing method for invoicing based on usage of ink, toner, or other printing fluids, printing liquids, or other printing material. To simplify the following discussion, the term "ink" will be used in the specification and the claims as a generic term that represents, fluids, liquids, or other materials for printing, such materials including ink, toner, organic materials, and the like.

Description of the Related Art

Printers such as inkjet printers and laser printers generally print text, pictures, or other content (referred to herein generally as "information") on plain paper, special paper, or another recording medium by placing or fusing ink on the recording medium. The ink is typically stored in a cartridge which can be freely installed into and removed from the printer. When the ink inside the cartridge is depleted in the course of using the printer, ink can be added by simply replacing the cartridge.

Printer manufacturers also usually supply the ink and toner cartridges that are used in their printers to the end users, and are therefore also in the business of selling cartridges filled with ink.

More recently, manufacturers have developed new billing systems for charging the printer user based on the amount of ink consumed in addition to selling individual cartridges.

Japanese Unexamined Patent Appl. Pub. 2002-36582 discloses a billing system in which the inkjet printer uses optical sensors to measure how much ink remains in the ink cartridge, and calculates ink usage based on how much ink remains. A data processing device connected to the inkjet printer acquires data relating how much ink is used (referred to below as simply "ink usage") from the inkjet printer, and sends data relating to ink usage over a network to a server in a service center. The billing module that runs on the service center server then references an ink billing table to calculate the billing amount based on ink usage and bills the user.

Ink billing systems can be deployed in many ways. In one such system the printer manufacturer (ink supplier) provides multiple printers to a client company, and uses an ink billing system to invoice the client for the ink used instead of simply selling and charging for the individual ink cartridges that are used in the printers. In this scenario the ink billing system must be able to detect how much ink was used by the multiple printers and charge the client based on this ink usage information collected from the multiple printers. The printer manufacturer can expect clients that use many printers will use a large amount of ink, and providing other value-added services as part of the ink billing process can therefore be very effective. If the printer manufacturer deals with numerous companies, it may also be desirable to tailor the additional services offered to different clients.

The present invention provides a ink billing system and ink billing method that can be beneficially used in systems involving a plurality of printers.

SUMMARY OF THE INVENTION

A first aspect of the invention is an ink billing method that is used between a client that prints information in one or more retail stores and an ink supplier that supplies cartridges, which store ink, to the client. The ink billing method comprises steps of: installing a plurality of printers in one of the retail stores, each of the printers comprising a cartridge storing ink and a print head having nozzles for discharging the ink; discharging first ink from the nozzles onto paper for printing the information; discharging second ink from the nozzles for cleaning or recovering the nozzles, the second ink being consumed in the cleaning or recovering; calculating an ink usage amount for each of the printers by counting the first ink discharged from the nozzles; providing a first server in the one of the retail stores, the first server being in communication with the plurality of printers installed in the one of the retail stores; collecting the ink usage amount of the first ink for the plurality of printers installed in the one of the retail stores by the first server; providing a second sever that is in communication with the first server; receiving the collected ink usage amount of the first ink from the first server by the second server; and calculating an invoice amount for the ink supplier by using the collected ink usage amount of the first ink received by the second server.

The ink billing method ink billing system may further comprise installing a plurality of POS terminals in the one of the retail stores, each of the plurality of POS terminals being in communication with the first server; acquiring product information from one of the plurality of POS terminals by the first server; and determining whether or not to send print information to one of the plurality of printers based on the product information.

Another aspect of the invention entails an ink billing system that is used between a client that prints information in one or more retail stores and an ink supplier that supplies cartridges, which store ink, to the client. The ink billing system comprises: a plurality of printers installed in one of the retail stores, each of the printers comprising a cartridge storing ink and a print head having nozzles for discharging the ink, each of the printers discharging first ink from the nozzles onto paper for printing the information and discharging second ink from the nozzles for cleaning or recovering the nozzles, the second ink being consumed in the cleaning or recovering, each of the printers calculating an ink usage amount by counting the first ink discharged from the nozzles; a first server in the one of the retail stores, the first server being in communication with the plurality of printers installed in the one of the retail stores, and collecting the ink usage amount of the first ink for the plurality of printers in the one of the retail stores; and a second server in communication with the first server for receiving the collected ink usage amount of the first ink from the first server, the second server calculating an invoice amount for the ink supplier using the collected ink usage amount of the first ink received by the second server.

The ink billing system may further comprise a plurality of POS terminals, each installed for the one of the retail stores, each of the plurality of POS terminals being in communication with the first server. In such arrangement, the first server acquires product information from one of the plurality of POS terminals and determines whether or not to send print information to one of the plurality of printers based on the product information.

Other objects and attainments together with a fuller understanding of the invention will become apparent and appreciated by referring to the following description and claims taken in conjunction with the accompanying drawings.

DESCRIPTION OF THE PREFERRED EMBODIMENTS

As previously mentioned, to simplify the following discussion, the term "ink" will be used in the specification and the claims as a generic term that represents, fluids, liquids, or other materials for printing, such materials including ink, toner, organic materials, and the like.

Preferred embodiments of an ink billing system and ink billing method according to the present invention are described below with reference to the accompanying figures using by way of example a printer and printing system according to the present invention.

Figure 1:
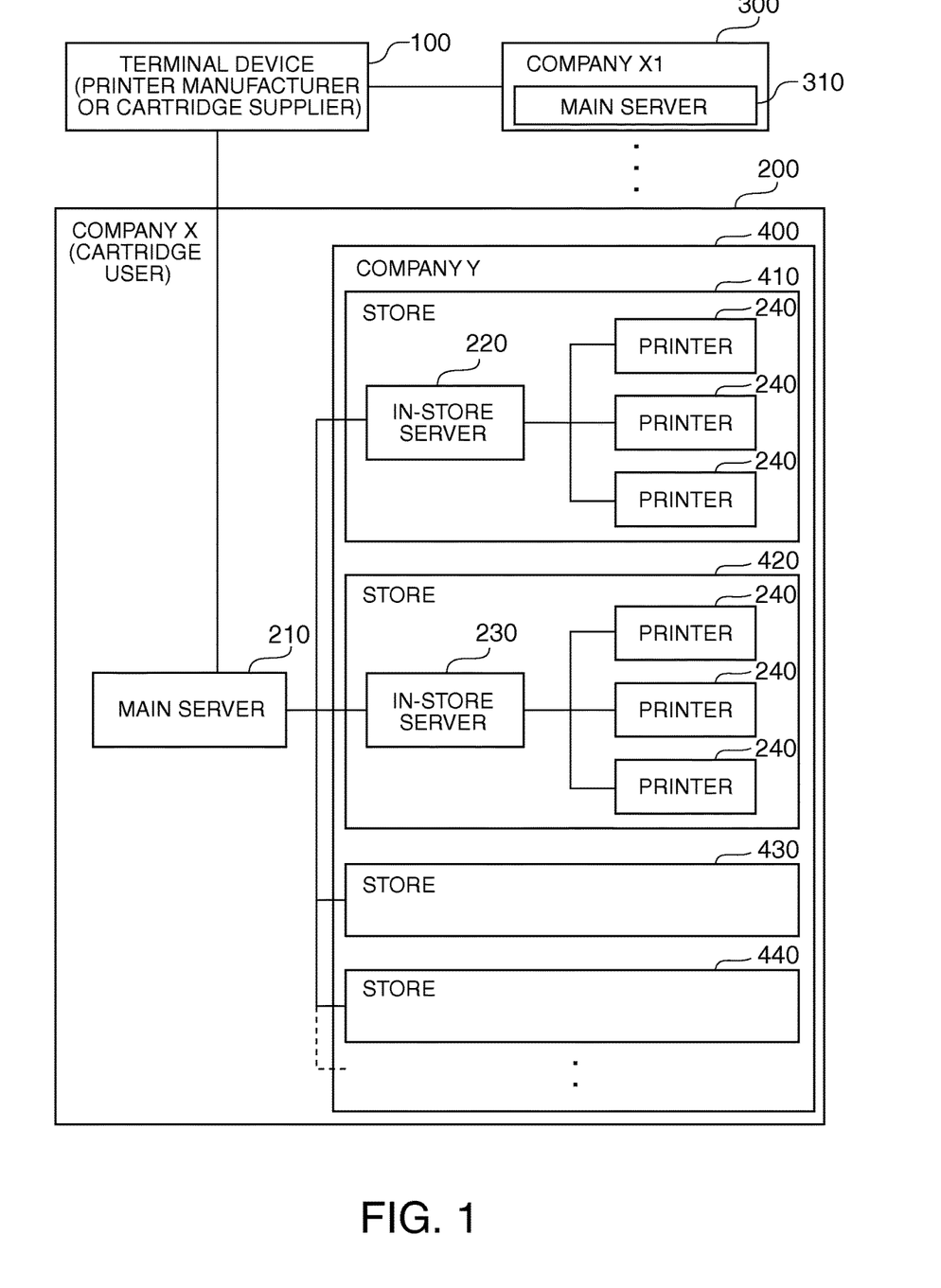
FIG. 1 is a block diagram of an ink billing system for billing for ink usage using a printer and printing system according to the present invention.

FIG. 1 is a block diagram of an ink billing system for billing for ink usage using a printer and printing system according to a preferred embodiment of the present invention.

Ink Billing System Concept

In an ink billing system according to this embodiment of the invention, a terminal device 100 run by the printer manufacturer (the supplier of cartridges containing the ink, and referred to herein as the cartridge supplier or ink supplier, manages supplying cartridges filled with ink as the ink to company X 200 and company X1 300 (the cartridge user, also referred to herein as the client), which have purchased a plurality of color inkjet printers 240, and company X 200 or company X1 300 pays the printer manufacturer an ink fee according to the amount of ink that was used for printing by the printers 240.

In this ink billing system, company X 200 is a company that issues coupons for particular products and obtains advertising income according to the number of coupons issued. For brevity FIG. 1 shows only company X 200 and the main server 210 used by company X 200, and company X1 300 and the main server 310 used by company X1 300, but there could be additional client companies. The invention is described using company X 200 by way of example.

Company X 200 installs an in-store server (data processing apparatus) 220, 230 and a plurality of printers 240 purchased from the printer manufacturer in a plurality of stores 410 to 440 that are owned or managed by company Y 400 (such as a customer of company X 200). Only the in-store server and printers in stores 410 and 420 are shown in FIG. 1 for brevity. Each printer 240 is in communication via a LAN with the in-store server 220, 230.

Company Y 400 in this example is a supermarket or other retailer. The printers 240 can be printers for printing receipts, but are described as separate from the receipt printers in this embodiment of the invention. More particularly, the printers 240 are installed near the check-out counter at each POS terminal in each store 410 to 440. Each printer 240 is configured to issue coupons, for example, linked to specific product information input from the POS terminal according to instructions from the in-store server 220, 230 installed in the same store. The issued coupons are then handed to the customer by the POS terminal operator of company Y 400.

The main server (data processing apparatus) 210 is maintained by company X 200, and is in communication via a private or public communication network such as the Internet with each of the in-store servers 220, 230 located in the stores 410 to 440. The main server 210 sends product information to the in-store servers 220, 230. The main server 210 is also used to manage the product information, and sends data used to print the coupons that are output by the printers 240 in conjunction with the product information, and receives from the in-store servers 220, 230 information about the type and number of coupons issued by the printers 240, for example.

The printer manufacturer in this ink billing system supplies ink cartridges ("cartridges" below) containing ink to company X according to demand (ink usage). Demand can be calculated and predicted by the terminal device 100 run by the printer manufacturer based on ink usage by the user. The printers 240 are installed at the checkout counters with the POS terminals in company Y 400. The ink cartridges supplied by company X 200 are installed in the printers 240. A scanner located at the POS terminal scans the barcode including a product code affixed to each product, and the in-store server 220, 230 then acquires product information corresponding to each product code and determines if there is coupon information to be printed. If there is coupon information to be printed, the server sends appropriate print data to the printer 240 to issue a coupon. The in-store server 220, 230 (data processing apparatus) in each of the stores 410 to 440 regularly collects (receives) information relating to ink usage from each of the connected printers 240 and sends the information to the main server 210.

Regularly or in response to a request from the terminal device 100 of the printer manufacturer, the main server 210 of company X 200 then sends the ink usage amount for the printers 240 collected in the main server 210 over a network to a terminal device 100 operated by the printer manufacturer. The ink usage amount collected in the main server 210 could alternatively be recorded on a CD (Compact Disc), DVD (Digital Versatile Disc), or other data storage medium which is then delivered to the printer manufacturer. The printer manufacturer or terminal device 100 then tabulates the ink usage amount received from company X 200 and periodically bills company X 200 for the ink usage. The terminal device 100 produces billing information including the calculated ink fee and sends the billing information over the network to the main server 210. Based on this billing information, company X 200 then remits payment to the printer manufacturer via the main server 210 executing an on-line payment transaction with a bank, for example.

The company X 200 also returns empty ink cartridges collected from company Y 400 to the printer manufacturer. The printer manufacturer refills the returned ink cartridges and then returns the refilled ink cartridges to company X 200.

The ink billing system according to this embodiment of the invention only bills for the amount of ink used for printing coupons and other content. Ink that is not used for printing includes, for example, ink that is consumed by cleaning processes, print head recovery processes, and ink path charging operations, including the ink that is used to flush the nozzles and ink that is vacuumed from the nozzles as part of print head nozzle maintenance. More specifically, there is no charge for ink that is consumed by operations that are run so that ink can be discharged from the print head in order to print. An advantage of this system is therefore that company X 200 does not need to pay for ink that is not used to print the coupons.

Relationship Between the In-Store Server and Printers

The relationship between the in-store server 220 (230) and printers 240 of the printing system according to this embodiment of the invention is described next with reference to FIG. 2.

Figure 2:
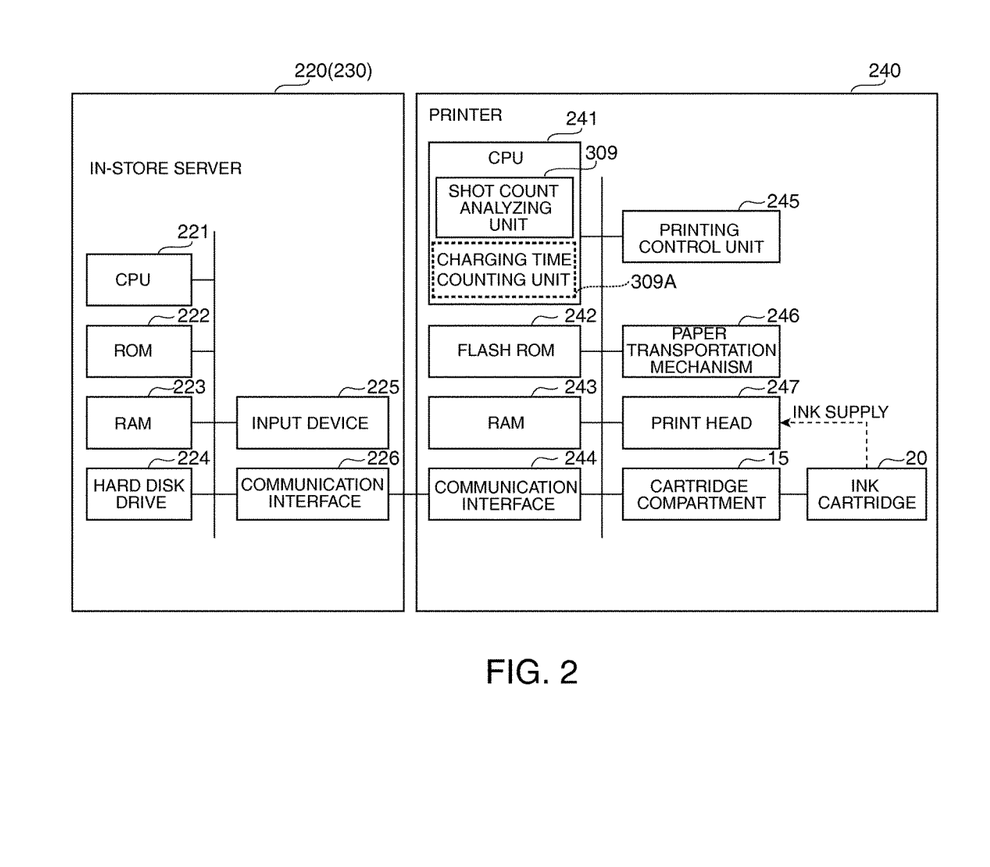
FIG. 2 is a schematic block diagram showing the arrangement of an in-store server and printer.

FIG. 2 is a schematic block diagram showing the arrangement of the in-store server 220 (230) and printer 240.

As shown in FIG. 2 the main parts of the in-store server 220 (or in-store server 230 or other servers) are the CPU 221, ROM 222 (nonvolatile memory), RAM 223 (volatile memory), a hard disk drive 224 as a large capacity storage device, an input device 225, and communication interface 226. The in-store server 220 controls the printer 240 as a result of the CPU 221 running the operating system and software applications stored in the hard disk drive 224, and sending commands and print data to the printer 240 through communication interface 226.

The printer 240 is composed primarily of a CPU 241, flash ROM 242 (rewritable nonvolatile memory), RAM 243 (volatile memory), communication interface 244, a printing control unit 245 for controlling discharging ink onto roll paper to print, a paper transportation mechanism 246, a print head 247, and an cartridge compartment 15 into which the ink cartridge 20 is loaded. The printer 240 receives commands and print data by communicating with the in-store server 220 through the communication interface 244 while the CPU 241 runs firmware stored in flash ROM 242. Based on the received print data, the printing control unit 245 conveys roll paper using the paper transportation mechanism 246 while driving the print head 247 to print on the roll paper to issue coupons.

The CPU 241 controls a shot count analyzing unit 309 by running a specific program stored in flash ROM 242. Alternatively, the CPU 241 controls a charging time counting unit 309A by running a specific program stored in flash ROM 242.

The shot count analyzing unit 309 counts the ink droplets discharged from the print head 247 as the number of shots of each color of ink in dot units based on the print data or the dot pattern data generated from the print data. The ink cartridge typically will store plural types (colors) of ink, e.g. cyan, magenta, yellow, and black. The shot count analyzing unit 309 counts the number of shots for each of the plural types (colors) of ink. The amount of ink discharged from the print head 247 differs according to the size of each dot, that is, whether each dot is small, medium, or large. The shot count analyzing unit 309 converts each size of dot to a corresponding shot count, and calculates how many shots were discharged. The shot counts calculated by the shot count analyzing unit 309 are then stored in flash ROM 242. The cumulative shot count from a particular point in time, such as when the ink cartridge 20 is replaced, is also stored. The shot count analyzing unit 309 can also calculate ink usage from the shot count.

The shot count analyzing unit 309 counts the ink droplets discharged from the print head 247 to print on the roll paper in dot units converted to a shot count for each color, and does not count as part of ink usage amount the ink discharged from the print head 247 during nozzle flushing or the ink vacuumed from the print head 247 by an ink suction mechanism (not shown) for example.

Acquiring Billing Status Information from the Printer

The shot count calculated by the shot count analyzing unit 309 is sent regularly or in response to a request from the in-store server 220 from the printer 240 to the in-store server 220 as part of the billing status information used for billing. In addition to the shot count, the billing status information includes the printer serial number, remaining ink level, and ink cartridge IDs. At a predetermined time or in response to a request from the in-store server 220, the billing status information is then collected on (sent to) the main server 210. The billing status information stored on the main server 210 is sent regularly, or in response to a request from the in-store server 220, to the terminal device 100. The terminal device 100 of the printer manufacturer can then determine ink usage by the printers 240 and the condition of each ink cartridge 20.

Figure 3:
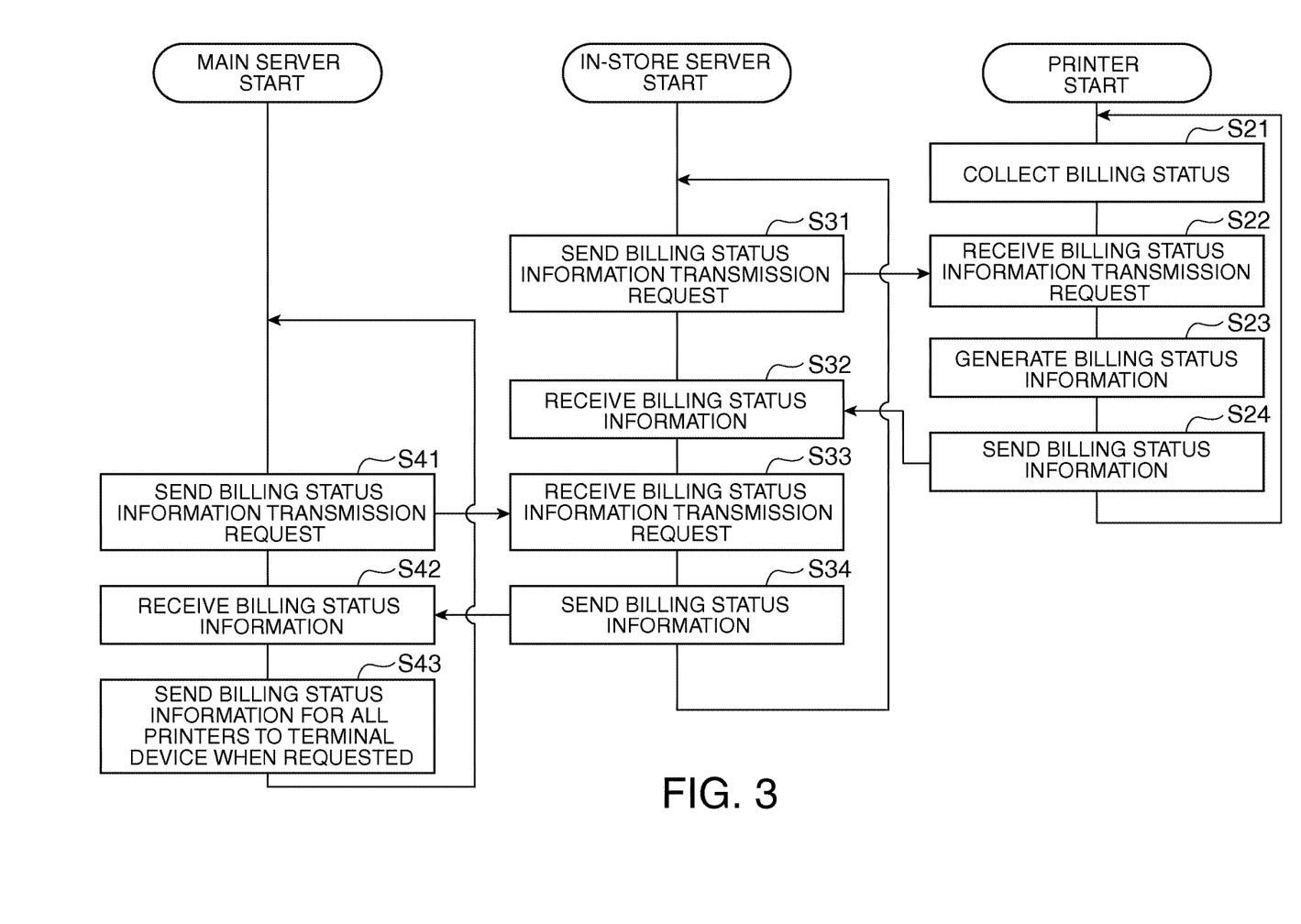
FIG. 3 is a flow chart of the billing status information collection process.

This process is described in further detail below with reference to FIG. 3. FIG. 3 is a flow chart illustrating the billing status information collection process.

First, each printer 240 counts and calculates the total number of shots using the shot count analyzing unit 309 and thus collects the billing status information (step S21).

The in-store server 220 collects the billing status information from each of the printers 240 at a predetermined time or when requested by sending a billing status information transmission request to all of the printers 240 in the store (step S31).

When a printer 240 receives a billing status information transmission request (step S22), the printer 240 generates the billing status information including the shot count (step S23) and sends the resulting billing status information to the in-store server 220 (step S24). The in-store server 220 then receives and stores the billing status information from the printer 240 (step S32).

The printer 240 then returns to step S21 to continue collecting the billing status information and repeats steps S22 to S26. As a result, the printer 240 can send the billing status information to the in-store server 220 whenever a billing status information transmission request is received.

After receiving the billing status information from the printers 240 by way of the in-store server 220 (230), the main server 210 sends a billing status information transmission request at a predetermined time or as required to all of the in-store servers 220 (230) (step S41).

When a billing status information transmission request is received (step S33), the in-store server 220, 230 sends the stored billing status information to the main server 210 (step S34). When the main server 210 receives billing status information from an in-store server 220, 230 (step S42), the main server 210 stores the billing status information. As a result, billing status information is collected by the main server 210 from all printers 240 insofar as the printers 240 are operating normally, that is, unless there is a problem with a particular printer 240 or a printer 240 is turned off.

When requested by the terminal device 100 of the printer manufacturer at a predetermined time or as needed, the main server 210 sends the billing status information collected from all printers to the terminal device 100 used by the printer manufacturer (step S43). The billing status information can be sent on-line or the billing status information could be recorded on a recordable data storage medium such as a CD or DVD that is delivered to the printer manufacturer. As a result, all billing status information stored on the main server 210 is transmitted or delivered to the printer manufacturer or the terminal device 100 designated by the printer manufacturer.

Requests from the terminal device 100 of the printer manufacturer do not need to be processed on demand. Alternatively, the company X 200 could assemble the billing status information according to a predetermined monthly schedule and send the monthly billing status information to the terminal device 100 designated by the printer manufacturer by a certain date each month, for example.

Tabulation by the Printer Manufacturer

The terminal device 100 of the printer manufacturer determines the total ink shot count (ink usage amount) by tabulating the ink shot count information in the billing status information.

The ink shot count indicates how much ink was used by each printer 240 each month, for example, and billing is based on this ink shot count.

Figure 4A:
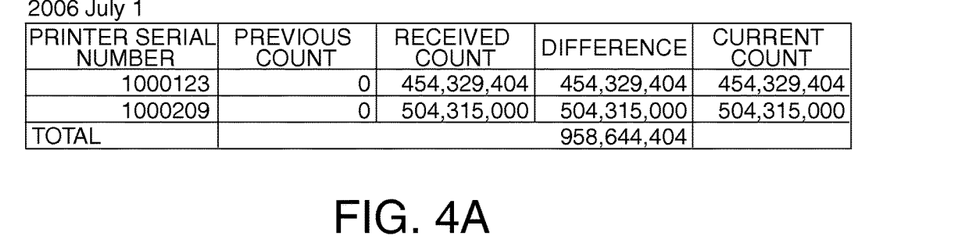
FIG. 4A to FIG. 4D show examples of the ink shot counts in the billing status information received from the main server by the printer manufacturer.
Figure 4B:
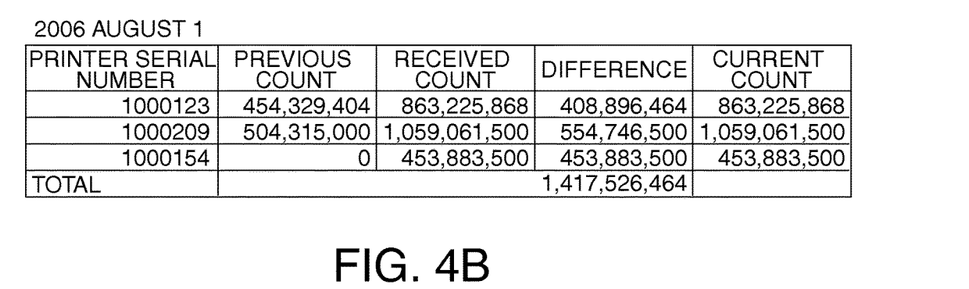
Figure 4C:
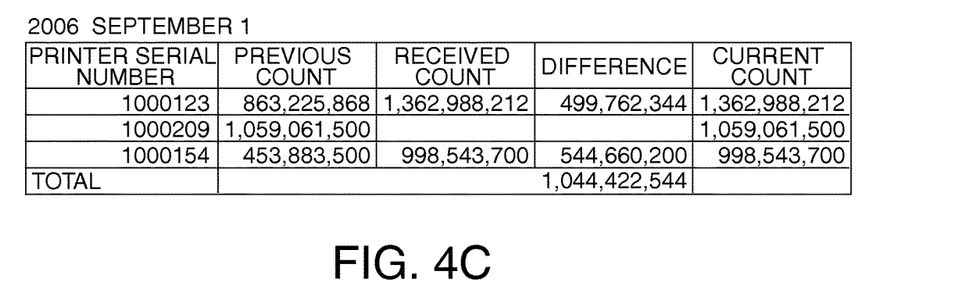
Figure 4D:
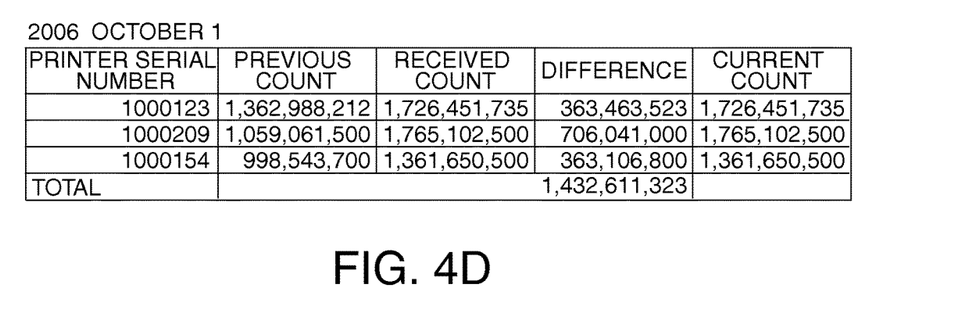

FIG. 4A to FIG. 4D show the ink shot counts from the billing status information received by the printer manufacturer's terminal device 100 from the main server 210 of company X 200. For brevity, the invention is used in an ink billing system having a maximum of three printers 240 in this example. FIG. 4A shows the ink shot count tabulation data for the period from the introduction of the ink billing system to Jul. 1, 2006, and FIG. 4B to FIG. 4D show the ink shot count tabulation data for the respective one month periods starting Aug. 1, 2006. For brevity, the total ink shot counts are not shown for each color in FIG. 4A to FIG. 4D, and the total ink shot count for all colors combined is shown by way of example.

As shown in FIG. 4A, two printers were in use as of Jul. 1, 2006. The "previous count" in each table in FIG. 4A to FIG. 4D is the total ink shot count as of the last tabulation, and is 0 in FIG. 4A because the billing system was just introduced. The "received count" is based on the billing status information received by the terminal device 100 designated by the printer manufacturer from the main server 210 (company X) for the current billing (tabulation) cycle, and the "difference" is the difference of the received count minus the previous count. The "current count" is a value corresponding to the ink shot count used by each printer 240 as known to the terminal device 100 of the printer manufacturer based on the received count at the current tabulation date, and is normally equal to the current received count. This "current count" becomes the previous count that is the basis for the next tabulation.

Each printer 240 stores the cumulative ink shot count calculated from the start of operation, and reports this cumulative ink shot count to the terminal device 100 designated by the printer manufacturer at each tabulation date. As a result, the ink usage amount from the previous tabulation date to the current tabulation date is denoted by the "difference" value in each table.

The total of these differential counts obtained for each printer 240 therefore denotes the total ink usage amount by company X 200 from the previous tabulation to the current tabulation. The terminal device 100 of the printer manufacturer can therefore calculate and determine the billing amount from the previous tabulation to the current tabulation, that is, the current billing period, by multiplying the ink cost per shot times this total ink usage amount. The terminal device 100 of the printer manufacturer then generates and sends billing information based on this billing amount to the main server 210 of company X 200, and the company X 200 remits payment for the invoiced amount to the printer manufacturer.

To complete the transaction, the company X 200 runs a payment application stored on the main server 210, for example, to transfer funds to the bank account designated by the printer manufacturer based on the received billing information by way of a bank server (not shown) that is connected to the main server 210 over a network. Alternatively, the printer manufacturer could send a conventional invoice to the company X 200 based on the invoice amount calculated by the terminal device 100, and the company X 200 could remit payment to the printer manufacturer based on the invoice by the desired form of payment, e.g. check.

The data table in FIG. 4B shows that the number of printers has increased from the number of printers reporting in FIG. 4A. This is because a new printer was added to the printing system by company X and an ink shot count carrying a printer serial number corresponding to the new printer is transmitted with the billing status information. A new printer record based on this information is therefore added to the data table, and the customer is billed based on the total number of ink shots reported by all printers, including the new printer.

If billing status information is not reported by a particular printer 240 for some reason, such as the printer 240 being turned off when the data is reported, the record for that printer is blank as shown in FIG. 4C. The difference field is therefore also blank (equals 0), not included in the total count, and the current count of that printer 240 for the current billing period is the previous count.

When billing status information is received for the same printer 240 the next time the billing status information is reported as shown in FIG. 4D, the received count is the total ink shot count for two billing periods, and the ink usage that was not previously reported or billed for is added to the current billing amount.

This data collection and tabulation process assures that the printer manufacturer can reliably bill the customer for ink usage by each printer 240 even when the printers 240 are located remotely from the terminal device 100 of the printer manufacturer. If billing status information is not received from a particular printer 240 for a certain period of time, a problem may have occurred and an inquiry can also be initiated.

Billing According to Ink Consumption

The terminal device 100 of the printer manufacturer in this embodiment of the invention provides company X 200 with the added service of adjusting the price per unit of ink (billing rate) consumed according to how much ink is used in a specific billing period, such as a month or other unit of time.

Figure 5:
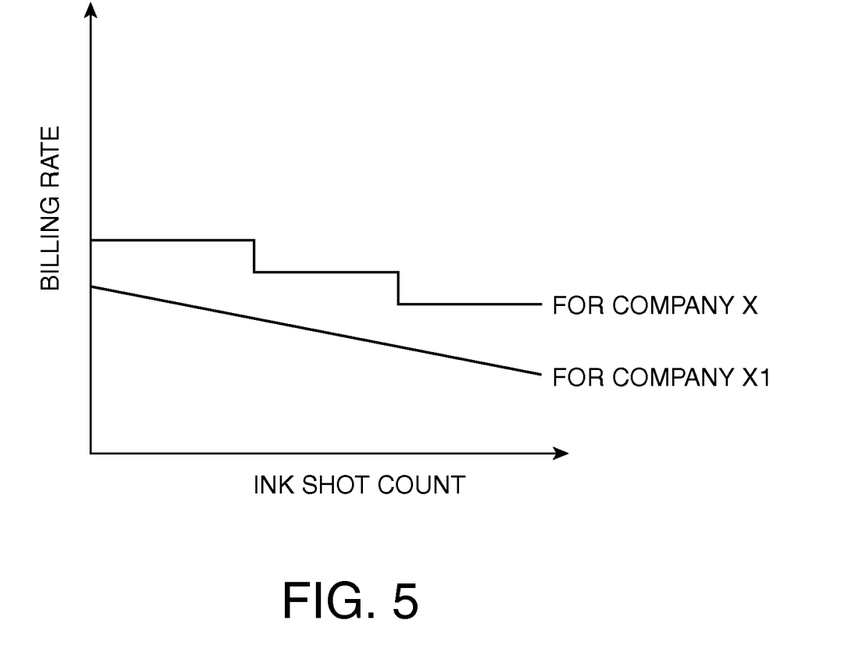
FIG. 5 is a graph illustrating the decrease in the unit billing price based on ink usage.

More specifically, the terminal device 100 of the printer manufacturer stores a billing rate table such as graphically represented in FIG. 5 and defines a billing method that gradually reduces the unit cost of ink (billing rate) in steps as the ink shot count rises. This enables the printer manufacturer or the terminal device 100 designated by the printer manufacturer that supplies the ink cartridges to discount the cost of ink for a particular client company X 200 based on how much ink the client uses. This helps promote even greater use of inkjet printers by the company X 200 and enables the supplier to develop a strategic business plan for improving customer satisfaction by reducing the cost of ink starting from the time the ink billing system is introduced.

In addition, if a different client company X1 300 uses even more ink than company X 200, a different billing table using a lower rate than offered to company X 200 can be used, or a billing table that reduces the cost of ink continuously linearly as ink usage increases can be used to even further discount the cost of ink. The printer manufacturer can therefore vary the content of the added service provided to each customer when the printer manufacturer deals with multiple companies, and can therefore adapt the business strategy to market conditions.

The billing rate tables maintained by the terminal device 100 of the printer manufacturer can be changed independently, and can be changed or updated as needed using an input device not shown. Alternatively, the rate table can be changed according to defined rules, such as lowering the billing rate for a particular client to a specific level when the total ink usage in a specified period of time reaches a specified level. This is accomplished by running an appropriate billing application stored on the terminal device 100 of the printer manufacturer.

Furthermore, by knowing the ink usage as described above, the terminal device 100 of the printer manufacturer can also provide an ink cartridge inventory management service for the client company X 200. More specifically, the printer manufacturer can predict when ink cartridges will be depleted based on the ink shot count information, and based on this information can resupply the company X 200 with the required number of ink cartridges in a timely manner so that the company X 200 does not run out of ink cartridges.

Being able to predict ink cartridge depletion also makes production scheduling and management easier for the printer manufacturer, and eliminates concerns about carrying excessive inventory.

The invention is described herein as billing for ink usage based on ink shot count information, but the invention is not so limited and the bill for ink usage can be based on a different unit of measure such as how many coupons are printed, that is, how much printed matter is printed. In this scenario the terminal device 100 of the printer manufacturer acquires the printed coupon count instead of the ink shot count from the main server 210 of the company X 200, sets a fee for each coupon, and bills the client accordingly. The ink usage fee can also be discounted according to the number of coupons printed in one month or other specified unit of time.

The printer manufacturer is the ink cartridge supplier in this embodiment of the invention, but the invention is not so limited. A middleman such as an ink cartridge supply company or an ink cartridge manufacturer that manufactures and sells just ink cartridges could function between the printer manufacturer and the client company X 200.

The invention is described using an inkjet printer by way of example, but the invention is not so limited and can be used with laser printers, for example. In this case toner is used instead of ink, and the photosensitive drum charging time is measured instead of the ink shot count. A charging time counting unit 309A is used instead of the shot count analyzing unit 309 described above to count the drum charging time, and the drum charging time is sent to the server as the billing status information instead of the ink shot count.

Toner for forming images is stored in the toner cartridges used in laser printers, and toner use depends on this photosensitive drum charging time. The client server can therefore calculate toner usage based on the charging time determined by the charging time counting unit, and a terminal device run by the toner cartridge supplier can invoice the client based on the reported charging time. Toner usage could also be calculated and sent by the laser printer to the client server.

In addition to this charging time information, printer serial numbers, remaining toner level, toner cartridge ID, and other information can also be sent as part of the billing status information and used for toner cartridge management.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An ink billing method that is used between a client that prints information in one or more retail stores and an ink supplier that supplies cartridges, which store ink, to the client, the ink billing method comprising steps of:

installing a plurality of printers in one of the retail stores, each of the printers comprising a replaceable cartridge storing ink and a print head having nozzles for discharging the ink, each print head being separate from its associated cartridge when installed in the corresponding printer;

discharging first ink from the nozzles onto paper for printing the information;

discharging second ink from the nozzles for cleaning or recovering the nozzles, the second ink being consumed in the cleaning or recovering;

calculating, by each of the plurality of printers, an ink usage amount for that printer by converting each dot of the first ink deposited to a shot count, based on a size of the dot, to calculate a number of shots of the first ink discharged from the nozzles;

providing a first server in the one of the retail stores, the first server being in communication with the plurality of printers installed in the one of the retail stores;

collecting, by the first server, the ink usage amount of the first ink for the plurality of printers installed in the one of the retail stores;

providing a second server that is in communication with the first server;

receiving, by the second server, the collected ink usage amount of the first ink from the first server; and calculating, by the second server, an invoice amount for the ink supplier by using the collected ink usage amount of the first ink received by the second server.

2. The ink billing method ink billing system described in claim 1, further comprising steps of:

installing a plurality of point-of-sale (POS) terminals in the one of the retail stores, each of the plurality of POS terminals being in communication with the first server;

acquiring product information from one of the plurality of POS terminals by the first server; and determining whether or not to send print information to one of the plurality of printers based on the product information.

3. An ink billing system that is used between a client that prints information in one or more retail stores and an ink supplier that supplies cartridges, which store ink, to the client, the ink billing system comprising:

a plurality of printers installed in one of the retail stores, each of the printers comprising a replaceable cartridge storing ink and a print head having nozzles for discharging the ink, each print head being separate from its associated cartridge when installed in the corresponding printer, each of the printers discharging first ink from the nozzles onto paper for printing the information and discharging second ink from the nozzles for cleaning or recovering the nozzles, the second ink being consumed in the cleaning or recovering, each of the plurality of printers calculating an ink usage amount by converting each dot of the first ink deposited to a shot count, based on a size of the dot, to calculate a number of shots of the first ink discharged from the nozzles;

a first server in the one of the retail stores, the first server being in communication with the plurality of printers installed in the one of the retail stores, and collecting the ink usage amount of the first ink for the plurality of printers in the one of the retail stores; and a second server in communication with the first server for receiving the collected ink usage amount of the first ink from the first server, the second server calculating an invoice amount for the ink supplier using the collected ink usage amount of the first ink received by the second server.

4. The ink billing system described in claim 3, further comprising:

a plurality of point-of-sale (POS) terminals, each installed for the one of the retail stores, each of the plurality of POS terminals being in communication with the first server;

wherein the first server acquires product information from one of the plurality of POS terminals and determines whether or not to send print information to one of the plurality of printers based on the product information.

* * * * *